(No Model.)
W. N. BATES.
GATE.
No. 442,093. Patented Dec. 9, 1890.
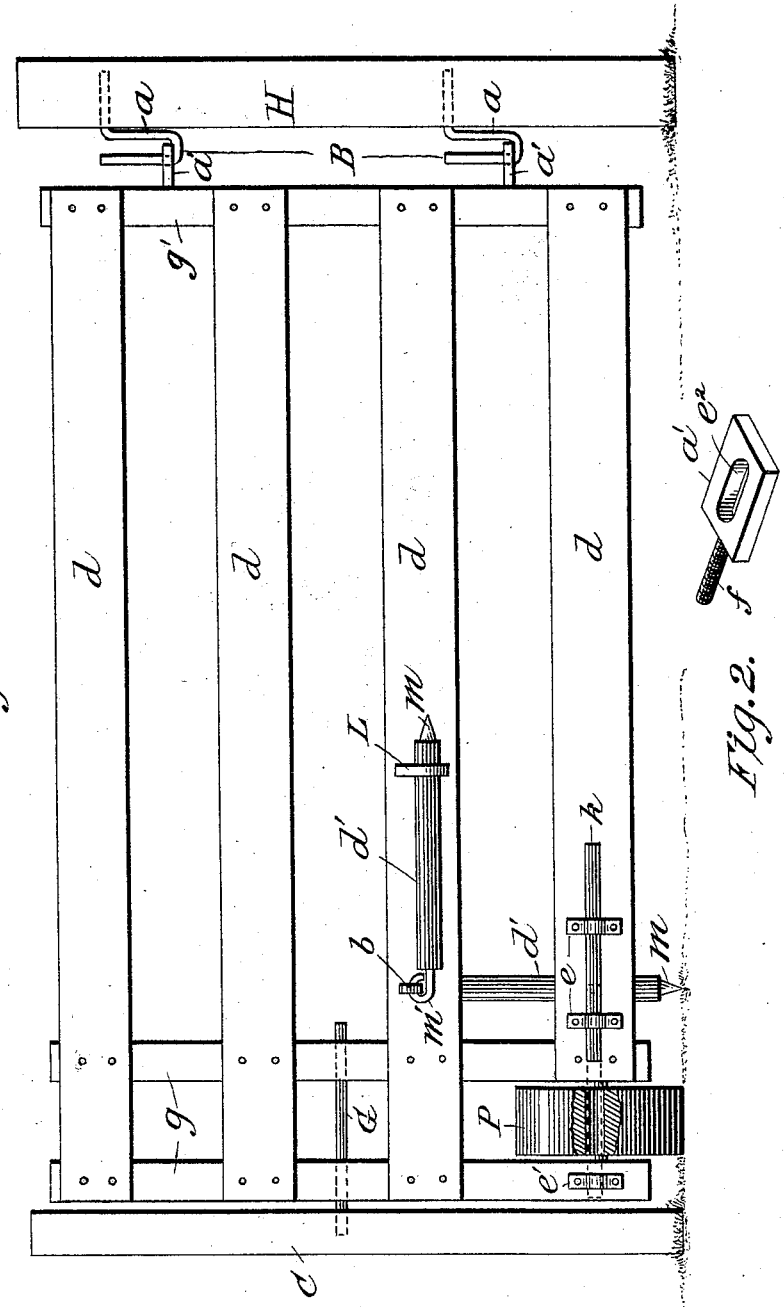
Witnesses:
Frank B. Huckstep
Charles E. Hutchins.
Inventor:
William N. Bates
By Thomas B. Swan
His Attorney

UNITED STATES PATENT OFFICE.

WILLIAM N. BATES, OF ATLANTIC, IOWA.

GATE.

SPECIFICATION forming part of Letters Patent No. 442,093, dated December 9, 1890.

Application filed July 31, 1890. Serial No. 360,595. (No model.)

*To all whom it may concern:*

Be it known that I, WILLIAM N. BATES, a citizen of the United States, residing at the city of Atlantic, in the county of Cass and State of Iowa, have invented certain new and useful Improvements in Gates; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in swinging gates; and the objects of my improvement are to reduce to the lowest limit the weight and strain of the gate on the hinges and on the post to which the gate is hung; also, to provide means for securing the open gate at any desired point. I attain these objects by the devices illustrated in the accompanying drawings, in which—

Figure 1 is a side elevation of the gate, and Fig. 2 is a perspective view of a section of one of the gate-hinges.

Similar letters refer to similar parts throughout the several views.

H is a post with its lower end inserted in the ground, to which the gate is hinged or hung. The gate is composed of the four longitudinal bars $d$ and the upright bars $g$ and $g'$.

P is a roller or wheel located between the lower ends of the upright bars $g$ and having gudgeons fixed in suitable bearings therein. It has an aperture passing through it parallel to its axis, properly located and of suitable size to admit the passage of the rod K.

C is a post with its lower end inserted in the ground.

G is a rod which slides through apertures in the two upright bars $g$, and its outer end enters a cavity adapted to receive it in the post C and latches the gate.

K is a sliding rod secured to the lower longitudinal bar $d$ by means of the loops $e$. It can be slid through an aperture in the roller or wheel P, adapted to receive it, and its outer end inserted in the loop $e'$, which operation locks the roller P, so that it cannot revolve, and converts it into a shoe. Stops are hinged one to each side of the gate by means of the perforated lugs or loops $m'$, which are secured to the ends of the rods $d'$ and to the perforated lugs or loops $b$ upon the gate. Metallic points $m$ are secured to the free ends of the rods $d'$. When not in use, the free ends of the stops rest in hooks L, secured to the gate, and when in use the points $m$ rest upon and enter the ground.

B are the gate-hinges, each being composed of the sections $a$ and $a'$. The sections $a$ are hooks secured to the post H. The section $a'$ is composed of a slotted plate or lug having a threaded stem $f$, by means of which the lug is secured to the upright bar $g'$. The ends of the hooks $a$ pass through the slots $e^2$ of the lugs and hinge the gate to the post H. The hinges being constructed with a slotted lug, as before explained, permit the free end of the gate to have an upward and downward movement sufficiently great to allow the roller or wheel P to rest upon the ground and support the free end of the gate at all times, even when the roller is passing over rough and uneven ground, and as the free end of the gate is supported by the roller there is but little strain on the gate-hinges or the post to which they are secured.

By lifting the stops A from the hooks L and permitting their points to enter the ground the gate when open can be secured so that the wind cannot close it, and it can be fastened at any desired point and the size of the passage made by opening the gate adjusted.

In the winter season it is often desirable to have a shoe in place of the roller or wheel P, and by sliding the rod K through the roller, as before explained, the roller is locked, so that it cannot revolve, and converted into a shoe, when it will slide over the ground. When there is damp snow or mud on the ground, if the roller or wheel P is permitted to revolve the snow or mud collects on its periphery, which clogs the roller, and it takes considerable labor to clean it; but by locking the roller the accumulation of the damp snow or mud on its periphery is prevented.

Having described my invention, what I claim as new, and desire to secure by Letters Patent, is—

1. The combination of the gate, the slotted hinges by means of which the gate is hung, the roller that supports the free end of the gate, and the means for locking the roller.

2. The combination of the gate, the slotted hinges by means of which the gate is hung, the stops hinged to the sides of the gate, the roller that supports the free end of the gate, and the means for locking the roller.

In testimony whereof I affix my signature in presence of two witnesses.

WILLIAM N. BATES.

Witnesses:
C. G. FUHLENDORF,
CHARLES MOTZ.